Patented Apr. 23, 1940

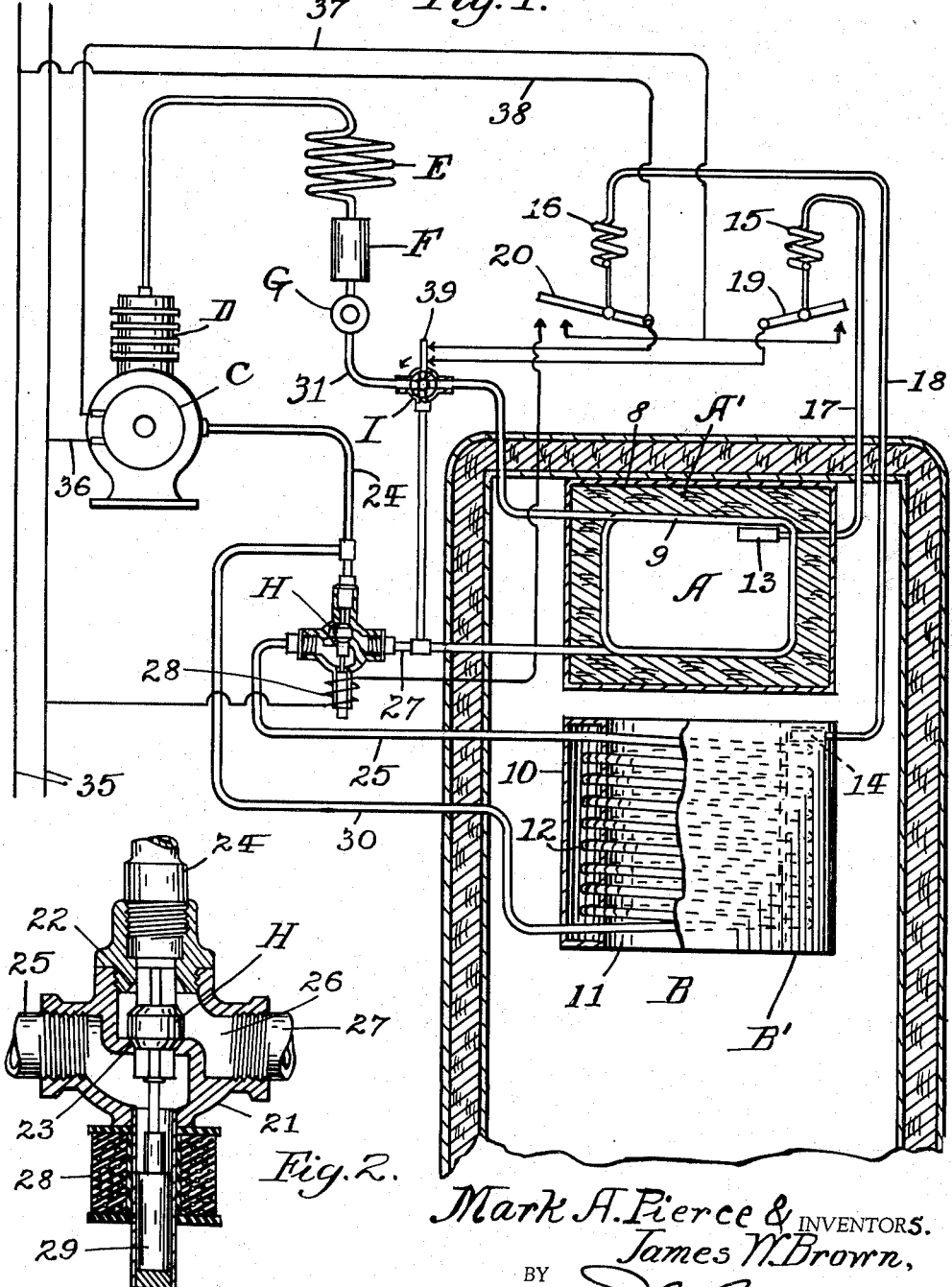

2,198,328

UNITED STATES PATENT OFFICE 2,198,328

REFRIGERATOR CONTROL

James W. Brown and Mark A. Pierce, Los Angeles, Calif.

Application December 27, 1937, Serial No. 181,825

2 Claims. (Cl. 62—3)

This invention relates to a refrigerator control system such as is commonly used for household purposes and wherein a cooling compartment above freezing point is employed for preserving food products and a separate freezing compartment below freezing temperature is maintained for freezing water and food products. The primary object of our invention is to maintain these units at their different respective temperatures automatically by simple and effective means and in the most efficient manner.

It has been customary to use the expansion of gas for effecting the heat exchange in refrigerating coils, the latter being employed in each compartment. Separate thermostats have been used in each compartment for controlling the operation of a compressor for maintaining the supply of refrigerant to the coils. In each instance the compartments have been operated independently at all times and the freezing compartment has been slow and sluggish in the performance of its function, due principally to the small supply of refrigerant which is available in most individual outfits. It is an object of our invention to supply refrigerant to the freezing coil whenever the temperature of either the freezing or cooling compartment is above normal, and after reducing the temperature of the cooling compartment to normal to shunt or direct the refrigerant wholly to the freezing coil until its predetermined temperature is established. In this manner an even temperature is produced in the freezing compartment and more effective results are attained in both the freezing and cooling compartments than heretofore. A further object is to combine with the functioning of the apparatus as above stated means for defrosting the freezing coil without interfering with the functioning of the cooling coil. Another object is to combine with the apparatus thus stated means for improving the circulation of air in the cooling compartment and for preventing the collection of moisture and frost in the cooling compartment without dehydrating the produce placed therein.

Referring to the drawing: Fig. 1 is a diagrammatic view of our improved system shown applied to a refrigerator, a detail of the latter being shown in vertical section, and Fig. 2 is a vertical central section through the control valve employed with our invention.

Referring to Fig. 1, the parts are only illustrated diagrammatically applied to a portion of a refrigerator, the latter being in vertical section. A indicates the freezing compartment and B the cooling or provision chamber which is maintained at a predetermined higher temperature above the freezing point. The freezing compartment contains the freezing element A', consisting of a thick enclosing insulated wall 8 containing an expansion coil 9 within the convolutions of which the products to be frozen can be placed. The cooling compartment B contains the cooling element B', consisting of a hollow wall 10 containing a dead air space within and forming a central down draft passage 11. An expansion coil 12 is enclosed in the hollow wall 10 and cooperates therewith to maintain cooling temperature within the cooling compartment, substantially of 32 degrees F. While we have shown an insulating jacket 8 and a hollow wall structure 10 respectively for insulating and securing heat exchange, any arrangement for the reception of the product to be cooled and any jacketing system for securing the heat exchange efficiently may be employed.

C represents an electric motor which controls a compressor D; E designates the usual condenser; F the receiver, and G the expansion valve or its equivalent, of any suitable kind. In the usual manner, the gasses are drawn into the compressor and compressed to a high pressure. They pass through the condenser where they are liquefied and thence to valve G. They finally are conducted through the expansion coils 9 and 12 as directed and return to the compressor. This involves the ordinary expansion type of refrigeration.

Thermostats 13 and 14 are located in the freezing element and in the wall of the cooling element respectively as will be hereinafter described, each being respectively connected with a switch actuating element 15 and 16 by ducts 17 and 18. These thermostats are of the fluid expansion type, the thermostat proper being in the form of a bulb of usual type and the actuator an expansion coil or bellows. The thermostats are set or regulated to operate their actuating elements at any predetermined normal temperature desired. For instance the thermostat 13 may be set to maintain a temperature of from 14 to 18 degrees F. in the freezing compartment A and the thermostat 14 to maintain a temperature of from 32 to 36 degrees F. in the cooling element. If the temperature rises above 18 degrees F. in compartment A the single pole switch 19 will be closed and if the temperature in the cooling compartment B rises above 36 degrees F. the double pole switch 20 will be closed. When the temperatures are maintained at their predetermined points in the freezing and cooling compartments the two switches are open as shown in full lines while if the temperature in either compartment rises above the predetermined degree the respective switch so effected is closed automatically.

H designates a three way control valve (see Fig. 2), which is electromagnetically operated within a suitable housing 21. This valve plays freely between two valve seats of corresponding ducts 22 and 23, the former connecting by a return duct 24 (see Fig. 1) with the ingress end of the compressor D. An ingress port passage 26 common to both valve seats is connected by duct 27 with the egress end of the freezing coil 9. Valve H before the refrigerating system functions, closes upon the valve seat 23 automatically, leaving the valve seat 22 leading to the compressor open, thereby connecting the egress end of the freezing coil 9 with the compressor intake through duct 24 and closing the connection through duct 25 with the ingress end of the cooling coil 12. Valve H is operated by the action of a solenoid 28, which energises a magnet core 29 connected to said valve and raises the latter into superior position, thus closing the port 22 leading through return duct 24 to the compressor and completing the connection in series of the freezing and cooling coils 9 and 12 so that the refrigerating medium after passing through the freezing coil traverses ducts 27 and 25 into the cooling coil and thence passes by the egress duct 30 to the return duct 24 into the compressor.

The electric motor C, which operates the compressor D is connected with the power supply circuit 35 by the conductor 36 on the motor side and the switch controlled conductors 37 and 38 on the other side, the latter two in turn being connected with suitable contacts on switches 19 and 20. Switch 20 which controls the operation of the freezing and cooling coils in series is continuously connected with conductor 38 while switch 19 controlling the operation of the freezing coil independently is connected with conductor 38 through a hand operated controlling switch 39, on a defrosting valve I, (to be hereinafter described), the latter when in normal position, that is connecting supply duct 31 with freezing coil, as shown in Fig. 1, completing the power supply connection with switch 19 and when turned into defrosting position, in the direction of the arrow, opening the circuit through said switch. The solenoid 28 is adapted to be connected by one of the closing contacts of switch 20 with the motor side of the power supply circuit 35. When switch 20 is open due to temperature in cooling coil being maintained at a predetermined degree, no current flows through the solenoid and valve H remains in its normal position as shown in Fig. 2. When switch 20 is closed by the temperature in the cooling element rising above a predetermined degree the solenoid is energized, valve H is raised into superior position and the freezing and cooling coils are thereby connected in series.

For the purpose of defrosting, the freezing coil 9 is cut out between the supply duct 31 and the egress duct 27, through the operation of a hand operated or other suitably actuated multiple passaged valve I. In one position of this valve the flow of refrigerant is directed by the temperature controlled valve H through the freezing coil and thence through the cooling coil and in another position the refrigerant is conducted through the cooling coil alone. Thus in the condition of defrosting the freezing coil 9 is bypassed and the refrigerant conducted to the cooling coil, thus maintaining the proper temperature of the cooling chamber during the function of defrosting. When valve I is in defrosting position the electric circuit through switch 19 is opened automatically by the auxiliary switch 39 carried by valve I, thereby directing full control of the apparatus through switch 20.

When starting the refrigerator, valve H will be in normal position and both switches 19 and 20 will be closed due to high temperature in their respective control compartments. Current from the supply line will then flow through both switches and the solenoid 28, thereby closing port 22 and opening port 23 and allowing the refrigerant to pass through freezing and cooling coils 9 and 12 in series. As a result the temperature in both compartments is lowered. Assuming that freezing chamber A reaches its predetermined low temperature first, switch 19 will open but current will continue to flow through switch 20 and continue energizing solenoid 28 thus continuing the flow of refrigerant through both coils in series until the cooling compartment B reaches its predetermined low temperature, at which time switch 20 will open and operation will cease. On the other hand should the cooling chamber B reach its low predetermined temperature first, switch 20 will open, thereby allowing solenoid 28 to assume its normal position. In this case switch 19 will continue to operate the motor but the refrigerant will no longer pass through the cooling coil but will bypass through port 22 of control valve H back to the compressor, this action continuing until the freezing coil reaches predetermined low temperature, at which time switch 19 will open and operation cease.

By constructing the cooling cell as described, condensation and frosting of its walls are prevented and an effective even temperature and circulation of air throughout the cooling chamber are created, making the function of refrigeration highly effective, and by bypassing the freezing coil as described the latter is defrosted without effecting the temperature and operation of the cooling coil, all of which features of our invention are highly advantageous.

In accordance with the patent statutes, we have described the features of construction of our invention together with the operation thereof, but we desire to have it understood that the construction shown is only illustrative and that the invention can be carried out by other means and applied to uses other than those above set forth within the spirit thereof and the scope of the following claims.

We claim:

1. In a refrigerating system the combination of two units, one used for freezing purposes and the other for cooling at and above the freezing temperature only, an evaporating coil associated with each of said units, valve controlling means connected with said coils for directing the flow of refrigerant either through said coils in series or through the coils used for freezing only, and electrically operated temperature controlled means associated with and influenced by the temperature produced by either of said coils for operating said controlling means, whereby the refrigerant is caused to flow only through the coil used for freezing or through both of said coils in series.

2. In a refrigerating system, a cooling cell having a substantially central duct formed by a sealed hollow wall, an evaporating coil enclosed within said hollow wall, and means for controlling the flow of refrigerant through said coil, said wall providing a dead air space within by which condensation and frosting of the coil is retarded and said duct and cell providing a circulation of air through the duct and around said cell.

JAMES W. BROWN.
MARK A. PIERCE.